United States Patent
Srinath

[19]

[11] Patent Number: 5,906,317
[45] Date of Patent: May 25, 1999

[54] METHOD AND APPARATUS FOR IMPROVING IMPROVED FLUIDIC OSCILLATOR AND METHOD FOR WINDSHIELD WASHERS

[75] Inventor: Dharapuram Srinath, Ellicott City, Md.

[73] Assignee: Bowles Fluidics Corporation, Columbia, Md.

[21] Appl. No.: 08/977,045

[22] Filed: Nov. 25, 1997

[51] Int. Cl.⁶ .................................. B05B 1/10; B05B 1/08
[52] U.S. Cl. ...................................... 239/284.1; 239/589.1
[58] Field of Search ............................... 239/284.1, 589.1

[56] References Cited

U.S. PATENT DOCUMENTS

| | | | |
|---|---|---|---|
| 4,463,904 | 8/1984 | Bray, Jr. ................................ | 239/289.1 |
| 4,508,267 | 4/1985 | Stouffer ............................ | 239/284.1 X |
| 4,645,126 | 2/1987 | Bray, Jr. ............................ | 239/284.1 X |
| 4,905,909 | 3/1990 | Woods ................................ | 239/589.1 |
| 4,955,547 | 9/1990 | Woods ................................ | 239/589.1 |
| 5,749,525 | 5/1998 | Stouffer ............................... | 239/284.1 |

Primary Examiner—Lesley D. Morris
Attorney, Agent, or Firm—Jim Zegeer, Esq.

[57] ABSTRACT

A vehicle fluidic oscillator for causing a jet of liquid to repeatedly sweep through a selected fan angle has a power nozzle coupled to a source of liquid under pressure, an oscillation chamber having an upstream end and a downstream end with the power nozzle at the upstream end, and an outlet to ambient at the downstream end. A pair of opposed control ports are provided at the upstream end, and sidewalls which diverge from the upstream end and then converge towards the outlet. A pair of control passages connect the downstream end of the oscillation chamber with the control ports, respectively, and a pair of bypass passages, one for each control passage, respectively, connect each control passage with the source of liquid under pressure. A method of adapting a fluidic windshield washer nozzle oscillator to iterations in vehicle designs is carried out by adjusting the widths of the bypass passages in accordance with iterations in such vehicle design to:

a) reduce the product design cycle time and b) reduce total system cost.

11 Claims, 2 Drawing Sheets

METHOD AND APPARATUS FOR IMPROVING IMPROVED FLUIDIC OSCILLATOR AND METHOD FOR WINDSHIELD WASHERS

BACKGROUND AND BRIEF DESCRIPTION OF THE INVENTION

Fluidic oscillators for delivering a fan spray of windshield washer liquid upon a vehicle glass or windshield are well known in the art and embodied in such patents as U.S. Pat. Nos. 4,157,161, 4,185,777, 4,463,904, 4,508,267 and 4,645,126, all assigned to the assignee hereof, and incorporated herein by reference. These patents relate to fluidic oscillator systems for cyclically deflecting a liquid jet between positions defined by a pair of end walls. Iterations in vehicle design can affect the product design cycle time.

The object of the present invention is to provide a novel fluidic oscillator and method which reduces product design cycle time by allowing easier creation of various iterations of the fluidic oscillator design, as opposed to the novel design control through the "critical orifice" approach. Critical orifices being very sensitive areas, iterations require precision machining in contrast in changing the width of passages in the invention proposed herewith.

A further object of the invention is to provide a system which allows the fine-tuning of the performance of a fluidic oscillator after the fabrication of the injection molding tool which further compresses the design cycle time and can prevent actually having to rebuild the molding tool in some instances.

Still a further object of the invention is to provide a fluidic oscillator circuit with aspect ratios closer to 1.0. This is advantageous for droplet size control which is an important feature for windshield washers.

Still a further object of the invention is to provide a method in which the size of the fluidic circuit and consequently the whole assembly can be reduced, making it more attractive for packaging, styling and material saving. This aspect also requires smaller tools and, therefore, small presses which further enhances the idea for reduction in total system cost.

Finally, a further object of the invention is to provide independent controls for two sets of slots or passages to allow fine-tuning of spray output during application, where different spray angles and different flow rates are needed based on varying working environment.

According to the invention, a conventional fluidic oscillator silhouette or circuit of the type disclosed, for example, in Bray U.S. Pat. No. 4,645,126 or Stouffer U.S. Pat. No. 4,508,267, in which a power nozzle is coupled to a source of liquid under pressure, feeds an oscillation chamber having an upstream end and a downstream end. A pair of opposed control ports at the upstream end of the chamber is coupled by a pair of control passages to control passage egresses the downstream end of the oscillation chamber. According to the invention, at least one power nozzle bypass passage, and preferably two, connect the control passages with the source of liquid under pressure. This results in a more advantageous windshield washer because it provides more flow from a smaller unit. By adjusting the sizes of the bypass passages, fine-tuning of the spray output for each application can be achieved where different spray angles and different flow rates are needed based on the varying working environment. Moreover, this permits the size of the fluidic circuit, and consequently the whole assembly, to be reduced, making it far more attractive in packaging and styling and material saving. It also requires small tools and therefore smaller presses which further enhances the concept of reduction for total system cost. Moreover, the fluidic circuit can have aspect ratios closer to 1.0 which allows better droplet size control which is an important feature for windshield washers.

DESCRIPTION OF THE DRAWINGS

The above and other objects, advantages and features of the invention will become more apparent when considered with the following specification and accompanying drawings wherein.

DETAILED DESCRIPTION OF THE INVENTION

Figure 1:
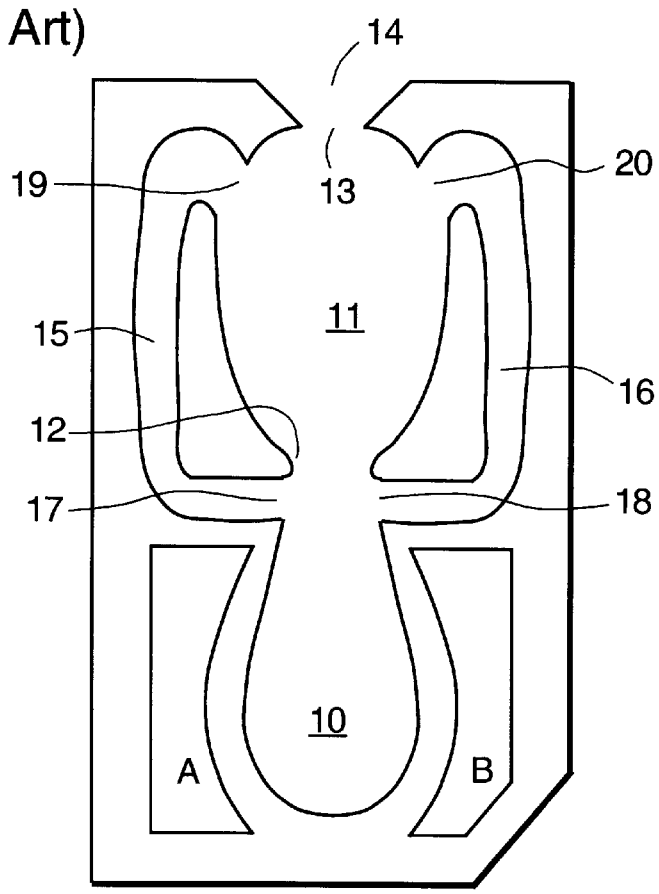
FIG. 1 (Prior Art) is a silhouette of a fluidic oscillator circuit of the type disclosed in Bray U.S. Pat. No. 4,645,126.
Figure 5:
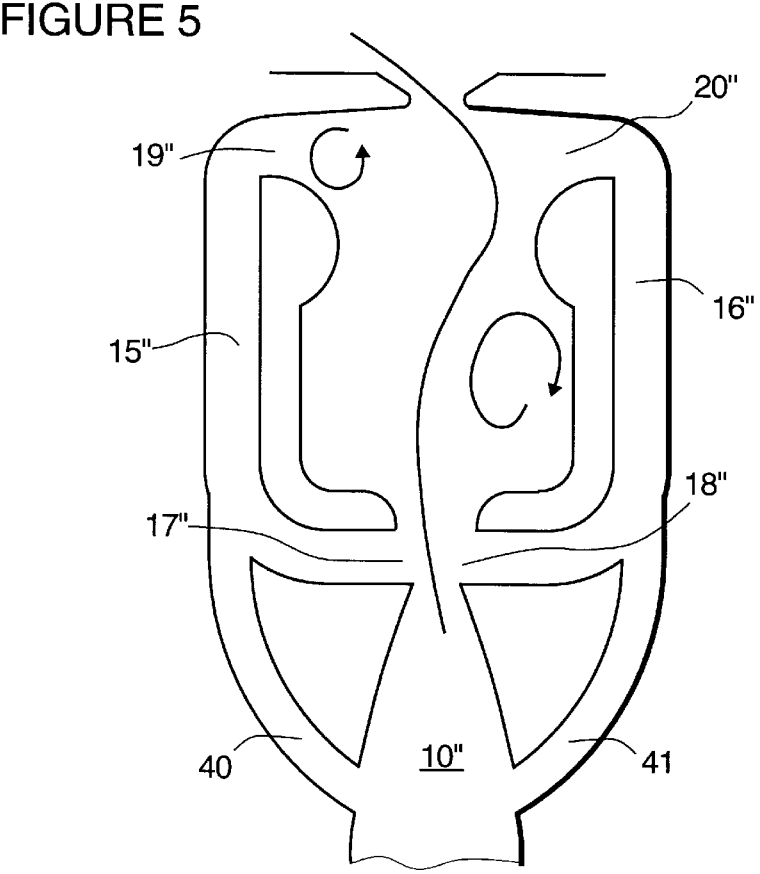
FIG. 5 is an illustration of a fluidic oscillator circuit of the type disclosed in Stouffer U.S. Pat. No. 4,508,267 incorporating the instant invention.

The fluid flow phenomena and effects utilized in causing oscillations in the fluidic oscillators of the type disclosed in FIGS. 1 and 5 are described fully in the respective of Bray U.S. Pat. No. 4,645,126 and Stouffer U.S. Pat. No. 4,508,267. Briefly, windshield washer liquid from a source (not shown) under pressure is introduced into a power nozzle 10. The liquid jet from the power nozzle must fill up the oscillation chamber 11 which has an upstream end 12 and a downstream end 13. Initially, a coherent jet of fluid travels from the power nozzle 10 through the throat of outlet 14 and downstream end 13 in a straight stream. The power jet must expand sufficiently to fill the throat at 13 before the interaction region and the oscillation feedback channels 15 and 16 begin to fill. Vortices are formed on either side of the jet of a fluidic oscillator, and, inasmuch as two vortices cannot exist simultaneously with equal intensity, one vortex becomes dominant and the power stream will be diverted against the one wall or the other wall, and oscillation begins. The fluid issuing from the power nozzle flows past a pair of control ports 17 and 18 which are coupled by control passages 15 and 16, respectively, to control port egresses 19 and 20. In this type fluidic oscillator, when one of the vortices forces the jet to one side or the other, one of the control passage egresses scoops a portion of the liquid jet and uses that portion as a control fluid in control passage 15 or 16. The scooped-off liquid is fed back to control port 17 or 18 to cause the jet to switch from one side to the other so that it flows along one sidewall or the opposite sidewall to exit after 14 in a sweeping pattern. The sweeping of the jet causes it to break up into droplets which can be controlled in size according to changes in the dimensions to be described more fully hereafter.

Figure 2:
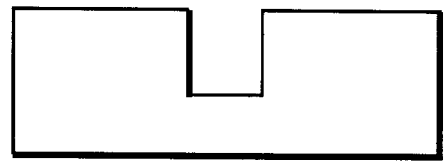
FIG. 2 is a sectional view through an element circuit passage in the fluidic oscillator of FIG. 1.
Figure 3:
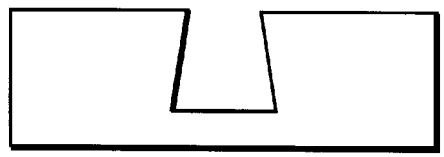
FIG. 3 is a sectional view showing the molding problems resulting from the walls of the critical orifices deforming due to collapse of the upper half when the depth of the circuit passages is increased to increase flow and change the aspect ratio.

As the size of the fluidic circuit is reduced, in order to maintain a given rate of flow, the fluidic circuit is made deeper. FIG. 2 illustrates the depth of a standard or normal fluidic circuit, and FIG. 3 illustrates that making a deeper circuit creates molding problems and provides a higher aspect ratio. This results in thicker sprays and more small droplets than normal aspect ratio fluidic circuits. The molding problem results from the walls of the critical orifices deforming due to the collapse of the upper half as shown in FIG. 3. According to the present invention, one or more bypass passageways are used to connect the control passages with the source of liquid under pressure. This provides more flow from a small unit. In addition, it enables reduction in the product design cycle time by allowing easier creation of various iterations of the design as opposed to the normal design to go through the "critical orifice" approach, the critical orifices being very sensitive areas, such as the outlet aperture, the power nozzle, the control ports and the control passage egresses. Iterations in these areas require precision machining in contrast to changing the width of the slots or bypass passages according to the present invention. Moreover, use of the invention allows fine-tuning of the performance of the fluidic oscillator after the fabrication of the injection molding tool which further compresses the design cycle time and can prevent actually having to rebuild the tool in some instances. A fluidic circuit with aspect ratios closer to 1.0 is more feasible with the present invention which also allows good droplet size control. The fluidic oscillator shown in FIG. 1 normally puts out a 95° heavy-ended spray angle at 730 milliliters per minute (ml/min) at 9 psi. It is heavy-ended due to the presence of attachment walls A1 and A2 which are absent from the oscillator circuit shown in FIG. 5 which provides a more uniform droplet distribution in the fan spray.

Figure 4:
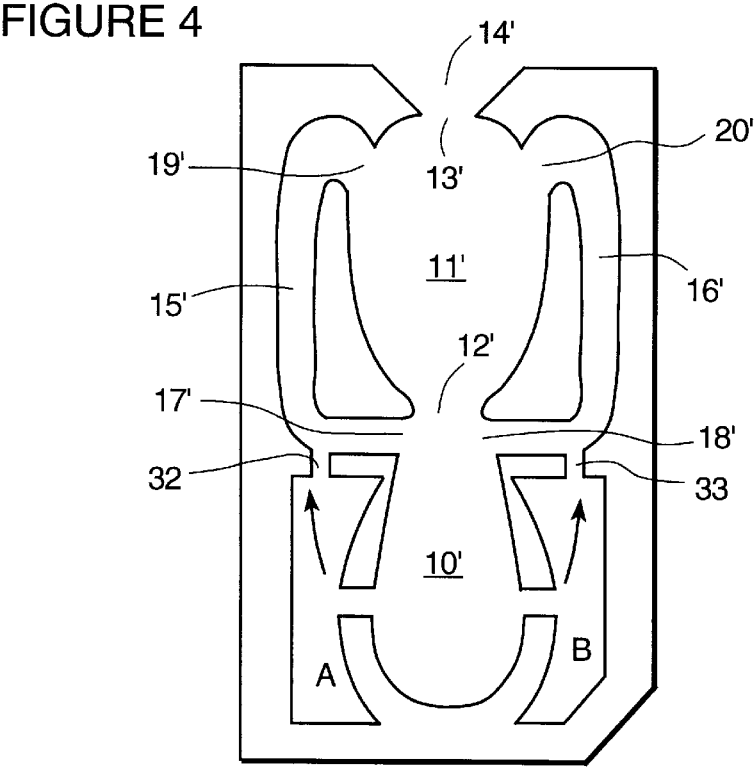
FIG. 4 is an illustration of a fluidic oscillation circuit of the type disclosed in Bray U.S. Pat. No. 4,645,126 incorporating the instant invention.

Referring now to FIG. 4, the primed numerals correspond to the same components in FIG. 1. In this embodiment of the invention, elements designated as L and R are cavities used to reduce the amount of material in the molded part. In this embodiment, the source of fluid under pressure coupled to the power nozzle 10 is also coupled through bypass openings 30 and 31 and bypass openings 32, 33 to control passages 15 and 16, respectively. Bypass openings 30 and 31 can be used to control the flow rate, and bypass openings 32 and 33 can be used to control the spray angle. Openings 30 and 31 increase the flow rate up to 850 ml/min and also as a consequence reduce the pattern angle to 45°. By increasing the width of openings 32 and 33, the spray angle can be increased without any appreciable change in the flow rate. In other words, by adjusting the width of openings 32 and 33, the spray angle can be adjusted, and by adjusting the width of openings 30 and 31, the flow rate can be controlled. From a windshield washer point of view, they provide more flow from a small unit. This does not incur the disadvantages discussed above in connection with FIGS. 2 and 3.

Referring now to FIG. 5, the fluidic oscillator of the type disclosed in Stouffer U.S. Pat. No. 4,508,267 is shown as incorporating the additional passages from the source of fluid in the power nozzle to the control passages. In this case, there are no wall attachment surfaces so the output spray results in more uniform droplet sizes in the spray, and the oscillation is essentially controlled by the formation of vortices which move and control the fluid egress to the control passages 15" and 16". However, while the mechanism of oscillation is significantly different between the device illustrated in FIG. 4 and the device illustrated in FIG. 5, the function performed by bypass passages 40, 41 connecting the control passages 15" and 16" with the source of liquid 10" under pressure is essentially the same, namely, it provides more flow from small size units and:

1. Reduces the product design cycle time by allowing easier creation of various iterations of the design as opposed to the normal design controlled through "critical orifice" approach.
2. Allows fine-tuning of the performance of the fluidic after the fabrication of a tool which further compresses the design cycle time and can prevent actually having to rebuild the tool in some instances.
3. The fluidic circuit with aspect ratios closer to 1.0 are more feasible with this invention which is also good for droplet size control, which is an important feature for windshield washers.
4. The size of the fluidic circuit and consequently the whole assembly can be reduced, making for more packaging, styling and material savings. This also requires smaller tools and, therefore, small presses which further enhance the idea for reduction of total system cost.

Independent controls can be provided for the two sets of slots 30, 31 and 32, 33 to allow fine-tuning of spray output during the application where different spray angles and different flow rates are needed based on varying working environments.

While preferred embodiments of the invention have been illustrated and described, it will be appreciated that various other embodiments, adaptations and modifications of the invention will be readily apparent to those skilled in the art.

What is claimed is:

1. In a vehicle fluidic oscillator for causing a jet of liquid to repeatedly sweep through a selected fan angle, said fluidic oscillator having a power nozzle coupled to a source of liquid under pressure, an oscillation chamber having an upstream end and a downstream end with said power nozzle being at said upstream end, an outlet at said downstream end, a pair of opposed control ports at said upstream end, sidewalls diverging from said upstream end and converging towards said outlet, and a pair of control passages connecting said downstream end of said oscillation chamber with said control ports, respectively, the improvement comprising at least one bypass passage means connecting said control passages with said source of liquid under pressure.

2. The vehicle fluidic oscillator defined in claim 1 wherein there are a pair of bypass passages, connecting said pair of control passages with said service of liquid under pressure and bypassing said power nozzle.

3. The vehicle fluidic oscillator defined in claim 2 wherein said oscillation chamber is free of attachment walls.

4. The vehicle fluidic oscillator defined in claim 2 wherein said oscillation chamber includes attachment walls.

5. A vehicle windshield washer system comprising in combination a source of wash liquid under pressure and a vehicle fluidic oscillator as defined in claim 1.

6. A vehicle windshield washer system comprising in combination a source of wash liquid under pressure and a vehicle fluidic oscillator as defined in claim 2.

7. A vehicle windshield washer system comprising in combination a source of wash liquid under pressure and a vehicle fluidic oscillator as defined in claim 3.

8. A vehicle windshield washer system comprising in combination a source of wash liquid under pressure and a vehicle fluidic oscillator as defined in claim 4.

9. In a vehicle fluidic oscillator for causing a jet of liquid to repeatedly sweep through a selected fan angle, said fluidic oscillator having a power nozzle coupled to a source of liquid under pressure, an oscillation chamber having an upstream end and a downstream end with said power nozzle being at said upstream end, an outlet at said downstream end, a pair of opposed control ports at said upstream end, sidewalls diverging from said upstream end and converging towards said outlet, and a pair of control passages connecting said downstream end of said oscillation chamber with said control ports, respectively, the improvement comprising a pair of bypass passage means, one bypass passage connecting each said control passage respectively with said source of liquid under pressure.

10. In a vehicle fluidic oscillator for causing a jet of liquid to repeatedly sweep through a selected fan angle, said fluidic oscillator having a power nozzle coupled to a source of liquid under pressure, an oscillation chamber having an upstream end and a downstream end with said power nozzle being at said upstream end, an outlet at said downstream end, a pair of opposed control ports at said upstream end, sidewalls diverging from said upstream end and converging towards said outlet, and a pair of control passages connecting said downstream end of said oscillation chamber with said control ports, respectively, the improvement comprising a pair of bypass passage means, one for each control passage, respectively, connecting each said control passages with said source of liquid under pressure.

11. A method of adapting a fluidic windshield washer nozzle oscillator to iterations in vehicle designs, comprising:

providing a vehicle fluidic oscillator for causing a jet of liquid to repeatedly sweep through a selected fan angle, said fluidic oscillator having a power nozzle coupled to a source of liquid under pressure, an oscillation chamber having an upstream end and a downstream end with said power nozzle being at said upstream end, an outlet at said downstream end, a pair of opposed control ports at said upstream end, sidewalls diverging from said upstream end and converging towards said outlet, and a pair of control passages connecting said downstream end of said oscillation chamber with said control ports, respectively, a pair of bypass passages connecting the control passages with said source of liquid under pressure, and adjusting the widths of said bypass passages in accordance with iterations in such vehicle design to:

a) reduce the product design cycle time and b) reduce total system cost.

* * * * *